United States Patent
Core et al.

(10) Patent No.: US 8,268,170 B2
(45) Date of Patent: Sep. 18, 2012

(54) FILTER

(75) Inventors: Phillip R. Core, West Yorkshire (GB); Digby J. Scott, West Yorkshire (GB)

(73) Assignee: Parker Hannifin (UK) Ltd., Hemel Hempstead (GB)

( * ) Notice: Subject to any disclaimer, the term of this patent is extended or adjusted under 35 U.S.C. 154(b) by 0 days.

(21) Appl. No.: 12/974,844

(22) Filed: Dec. 21, 2010

(65) Prior Publication Data

US 2011/0147297 A1    Jun. 23, 2011

Related U.S. Application Data

(63) Continuation of application No. PCT/GB2009/050738, filed on Jun. 26, 2009.

(51) Int. Cl.
- *B01D 27/08* (2006.01)
- *B01D 27/06* (2006.01)
- *B01D 35/30* (2006.01)

(52) U.S. Cl. .......... 210/232; 210/444; 210/450

(58) Field of Classification Search .......... 210/232, 210/444, 450
See application file for complete search history.

(56) References Cited

U.S. PATENT DOCUMENTS

| | | | |
|---|---|---|---|
| 4,537,681 A | | 8/1985 | Argiropoulos et al. |
| 4,941,975 A | * | 7/1990 | Schewe .......... 210/232 |
| 5,114,572 A | | 5/1992 | Hunter et al. |
| 6,015,492 A | | 1/2000 | Popoff et al. |
| 6,187,191 B1 | | 2/2001 | Koivula et al. |
| 6,533,933 B1 | * | 3/2003 | Stankowski et al. .......... 210/232 |
| 6,635,175 B2 | * | 10/2003 | Stankowski .......... 210/232 |
| 7,169,302 B2 | * | 1/2007 | Stockbower .......... 210/232 |
| 7,237,682 B2 | | 7/2007 | Reynolds et al. |
| 2006/0186031 A1 | * | 8/2006 | Fick et al. .......... 210/235 |

FOREIGN PATENT DOCUMENTS

| | | |
|---|---|---|
| EP | 0 830 885 A1 | 3/1998 |
| EP | 1 690 581 A1 | 8/2006 |
| GB | 2 295 970 A | 6/1996 |
| JP | 7027422 A | 1/1995 |
| WO | 2006/091557 A2 | 8/2006 |
| WO | 2007/011882 A1 | 1/2007 |

OTHER PUBLICATIONS

Search Report dated Nov. 7, 2008 of the UK Intellectual Property Office in corresponding Great Britain Application No. GB0812457.0.

Search Report dated Nov. 21, 2008 of the UK Intellectual Property Office in corresponding Great Britain Application No. GB0812457.0.

(Continued)

*Primary Examiner* — Thomas M Lithgow
(74) *Attorney, Agent, or Firm* — Christopher H. Hunter

(57) ABSTRACT

A filter including a filter bowl (4), filer head (48) and filter element (2). The filter element (2) comprises a locking ring (12), a first end cap (6) coupled to the locking ring (12), a filter media (10) coupled to the first end cap (6), and a locking rib (30) extending outwardly from the locking ring (12). The locking rib (30) comprises a first portion (34) which extends radially from the locking ring (12) and a second portion (38) which extends from the first portion (34) around the periphery of the locking ring (12). At least part of the second portion (38) of the locking rib (30) is arranged to flex relative to the first portion (34) of the locking rib (30). The locking rib (30) forms part of a bayonet connection.

29 Claims, 9 Drawing Sheets

OTHER PUBLICATIONS

International Search Report and Written Opinion, dated Jan. 18, 2010, in corresponding International Application No. PCT/GB2009/050738.

Notification of Transmittal of the International Preliminary Report on Patentability, dated Sep. 27, 2010, in corresponding International Application No. PCT/GB2009/050738.

\* cited by examiner

FILTER

CROSS REFERENCE TO RELATED APPLICATIONS

This application is a continuation of co-pending International Application No. PCT/GB2009/050738, filed Jun. 26, 2009, which designated the United States, the disclosure of which is incorporated herein by reference, and which claims priority to Great Britain Patent Application No. GB-0812457.0, filed Jul. 8, 2008 and Great Britain Patent Application No. GB-0812994.2, filed Jul. 18, 2008.

BACKGROUND OF THE INVENTION

The present invention relates to a filter. In particular, embodiments of the present invention relate to improvements to a filter such as a fuel filter forming part of a fuel supply system for a vehicle. Certain embodiments of the present invention relate to a locking mechanism for a filter. In particular, certain embodiments relate to a locking ring forming part of a replaceable filter element. Alternative embodiments of the present invention relate to a filter element, which in conjunction with a filter head and a filter bowl provides for a predetermined fluid flow path through the filter.

Fuel supply systems, and in particular vehicle fuel systems generally comprise at least one fuel filter to remove water and other contaminants from the fuel. There may be multiple fuel filters in a fuel supply system, for instance a primary filter for filtering out water, air and large particulate contaminants on the suction side (that is, upstream of the main fuel pump) and a secondary filter for removing fine particles on the pressure side (that is, downstream of the main fuel pump).

Typically, a fuel filter includes a removable filter element including a filter media. This allows the filter media to be changed as it becomes clogged by contaminants without requiring the entire filter to be replaced. This prevents the pressure drop across the filter increasing beyond its designed range.

A fuel filter may typically comprise a filter bowl and a detachable filter head. The filter element may be seated within the filter bowl such that the fuel must pass through the filter media in order to reach an outlet located within the filter head. Fuel may pass into the filter bowl through an inlet located in the filter head at a position relative to the filter element such that the fuel passes around and then through the filter media. Alternatively, the inlet may be positioned in the side of the filter bowl.

It is known for the filter head to be coupled to the filter bowl such that they may be uncoupled in order to access and replace the filter element. The coupling may comprise a screw thread or a bayonet connection between the filter head and the filter bowl. However, for some known fuel filters, it can be possible for the filter head to be coupled to the filter bowl without a filter element being inserted into the filter bowl. This would allow unfiltered fuel to pass to the outlet in the filter head risking damage to the rest of the fuel system.

For fuel filters in which the fuel enters through an inlet positioned in the side of the filter bowl the fuel fills the bowl from the bottom upwards such that any air present floats above the fuel. A second outlet may be provided towards the top of the bowl or in the filter head to allow air to be returned to the fuel tank. However, for fuel filters in which the fuel inlet is in the filter head, fuel fills the bowl from the top making it harder for air to rise to the top of the filter and settle out of the fuel. This turbulent mixture of fuel and air can impede the flow of air from the filter through the second outlet. Excess air present in the fuel filter can reduce the filtering efficiency of the filter media.

It is an object of embodiments of the present invention to obviate or mitigate one or more of the problems associated with the prior art, whether identified herein or elsewhere. In particular, it is an object of certain embodiments of the present invention to provide a locking ring for a filter which reduces the possibility that the filter may be assembled without a filter media being present (the locking ring being couplable to the filter element or forming part of the filter element). Furthermore, it is a particular object of alternative embodiments of the present invention to provide a filter element which increases the filtering efficiency of the filter media for fuel filters which have a fuel inlet in the filter head.

In accordance with a first aspect of the present invention there is provided a filter element comprising: a locking ring; a first end cap coupled to the locking ring; a filter media coupled to the first end cap; and a locking rib extending outwardly from the locking ring; wherein the locking rib comprises a first portion which extends radially from the locking ring and a second portion which extends from the first portion around the periphery of the locking ring, at least part of the second portion of the locking rib being arranged to flex relative to the first portion of the locking rib, the locking rib forming part of a bayonet connection.

An advantage of the first aspect of the present invention is that if the locking rib is not present then a corresponding rib extending from a first filter body component cannot correctly engage a bayonet connector slot in a second filter body component. This reduces the risk that a filter can be assembled without a filter element being enclosed in the filter.

SUMMARY OF THE INVENTION

In one embodiment of the present invention a filter element comprises: a locking ring; a first end cap coupled to the locking ring; and a filter media coupled to the first end cap; and a locking rib extending from the locking ring and comprising a first portion which extends radially from the locking ring and a second portion which extends from the first portion around the periphery of the locking ring, at least part of the second portion of the locking rib being arranged to flex relative to the first portion of the locking rib; wherein when the filter media is located within a first filter body component the locking rib is arranged to cooperate with a corresponding rib extending from the first filter body component or a second filter body component to form a composite bayonet connector rib such that the composite rib can engage a bayonet connector slot within the other of the first or second filter body components to couple the filter body components together to surround the filter media.

The locking rib may extend outwardly from the locking ring in the place of the locking ring. At least part of the second portion of the locking rib may be spaced apart from the periphery of the locking ring and is arranged to flex relative to the first portion of the locking rib. The locking rib may further comprise a first lug extending from the free end of the second portion of the rib transverse to the plane of the locking ring. At least part of the locking rib may be inclined relative to the plane of the locking ring. At least two locking ribs may be spaced apart about the locking ring.

The filter element may further comprise a first end cap coupled to the locking rib, the first end cap being arranged to support the filter media. The filter element may further comprise a second end cap spaced apart from the first end cap, the filter media extending between the end caps forming a central cavity defined by the end caps and the filter media. The first end cap may be coupled to and spaced apart from the locking ring via support ribs.

In accordance with a second aspect of the present invention there is provided a filter comprising: a filter element as described above; a first filter body component; and a second filter body component; wherein when the filter media is located within the first filter body component, the locking rib cooperates with a corresponding rib extending from the first filter body component to form a composite bayonet connector rib, the composite rib being arranged to engage a bayonet connector slot within the second filter body component to couple the filter body components together surrounding the filter media.

The first filter body component may comprise a filter bowl and the second filter body component comprises a filter head, and the corresponding rib may comprise a filter bowl rib and extends outwardly from proximal to the rim of the filter bowl.

The locking mechanism may further comprise a locking ring, the locking rib extending outwardly from the locking ring and the locking rib being couplable to the filter media via the locking ring, the locking ring being mountable upon the filter bowl such that the locking rib at least partially overlies a first portion of the filter bowl rib to form the composite bayonet connector rib.

The locking rib may comprise a first portion which extends radially from the locking ring and a second portion which extends from the first portion about the periphery of the locking ring such that when the locking ring is mounted on the filter bowl the first portion of the locking rib at least partially overlies the first portion of the filter bowl rib to form the composite bayonet connector rib.

The second portion of the locking rib may be spaced apart from the periphery of the locking ring, the rim further comprising a cut away portion proximal to the first portion of the filter bowl rib such that when the locking ring is mounted on the filter bowl the cut away portion is arranged to receive the first portion of the locking rib.

The second portion of the locking rib may be arranged to flex relative to the first portion of the locking rib, the locking rib further comprising a lug extending from the free end of the second portion of the rib, the bayonet connector slot further comprising a groove arranged to receive the lug when the composite rib is fully engaged in the bayonet slot.

The filter bowl rib may further comprise an end catch portion and the locking rib further comprises a groove arranged to receive the end catch portion such that the locking rib is partially received within the locking rib, the end catch portion being further arranged to engage the filter head bayonet connector slot if the filter bowl is coupled to the filter head without a filter element there between.

The second portion of the locking rib may further comprise a second lug extending in an opposite direction to the first lug, the second lug being arranged to overlap an end portion of the filter bowl rib remote from the end catch portion such that the locking rib and the filter bowl rib are coupled together.

At least part of the composite rib may be inclined relative to the plane of the locking ring and at least part of the bayonet slot comprises a corresponding incline.

At least one of the filter bowl and the filter head may further comprise an annular seal arranged such that when the filter bowl, the locking ring and the filter head are coupled together the annular seal is compressed between the filter bowl and filter head. The filter bowl may further comprise a disassembly feature arranged, during relative rotation of the filter head and the filter bowl to disassemble the filter, to engage the filter head forcing the filter bowl from the filter head and decompressing the annular seal between the filter bowl and the filter head.

In accordance with an embodiment of the present invention a filter element may comprise a first end cap; a second end cap; a filter media extending between the first and second end caps defining a central cavity, the first end cap having an opening into the central cavity; and a centre tube defining a passageway through the filter element from the first end cap to the second end cap; wherein when the filter element is received in a filter body formed from a first filter body component and a second filter body component the centre tube is arranged to communicate with a first opening in the first filter body component and the opening in the first end cap is arranged to communicate with a second opening in the first filter body component to define a fluid flow path between the first and second openings in the first filter body component, the defined fluid flow path passing through centre tube and the filter media.

According to a further embodiment of the present invention a filter element may comprise a first end cap; a second end cap; a filter media extending between the first and second end caps defining a central cavity, the first end cap having an opening into the central cavity; a centre tube defining a passageway through the filter element from the first end cap to the second end cap; and a locking ring spaced apart from the first end cap by support ribs; wherein the filter element defines a fluid flow path extending through the centre tube, through the filter media and through the central cavity to the opening into the central cavity.

A liquid can be supplied through the centre tube to the filter bowl such that the filter bowl is filled with the liquid from the bottom. This allows any gas present in the liquid supply to settle out from the liquid at the top of the filter bowl where it may be extracted.

The centre tube may pass through the central cavity and the opening in the first end cap, the centre tube being spaced apart from the sides of the opening by support ribs.

The walls of the centre tube may diverge towards the second end cap.

The filter element may further comprise a locking ring arranged to be supported on or proximal to the rim of a filter bowl, the locking ring being spaced apart from the first end cap by support ribs.

In accordance with a further embodiment of the present invention a filter may comprise: a filter element as described above; a filter bowl arranged to receive the filter element; and a filter head arranged to couple to the filter bowl such that the filter media is surrounded by the filter bowl and the filter head; wherein the filter head comprises a first inlet arranged to couple to the centre tube and a first outlet arranged to couple to the opening in the first end cap such that when the filter element is received in the filter bowl, fluid can flow from the first inlet to the first outlet passing through the filter media.

The filter head may further comprise a fluid inlet tube arranged to couple the first inlet to the centre tube and an annular cavity in fluid communication with the first outlet, the annular cavity being disposed around the inlet tube and being arranged to communicate with the opening in the first end cap of the filter element.

The filter element may further comprise a first annular seal around the centre tube and a second annular seal surrounding the opening in the first end cap such that when the filter element is coupled to the filter head the first annular seal is arranged to seal the connection between the fluid inlet tube and the centre tube and the second annular seal is arranged to seal the connection between the annular cavity and the opening in the first end cap.

A third annular seal may be provided on one of the filter bowl or the filter head such that when the filter bowl is coupled to the filter head the third annular seal is arranged to seal the connection between the filter bowl and the filter head.

The centre tube may be arranged to allow fluid to fill the filter bowl from its closed end, surround the filter element and pass through the filter media.

The filter head may further comprise: a second inlet; a second outlet; a pressure reduction valve coupled between the second inlet and the second outlet such that fluid received at the second inlet is passed to the second outlet at a reduced pressure; and a nozzle arranged to allow fluid to flow from the filter bowl to the second outlet.

The filter head may further comprise a cavity in fluid communication with the enclosed space between the filter bowl and the filter head, the nozzle extending between the cavity and the second outlet.

The filter bowl may further comprise: a water drain valve; and a deflector plate positioned between the second end cap and the water drain valve to divert fluid passing through the centre tube sideways.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENT

Figure 1:
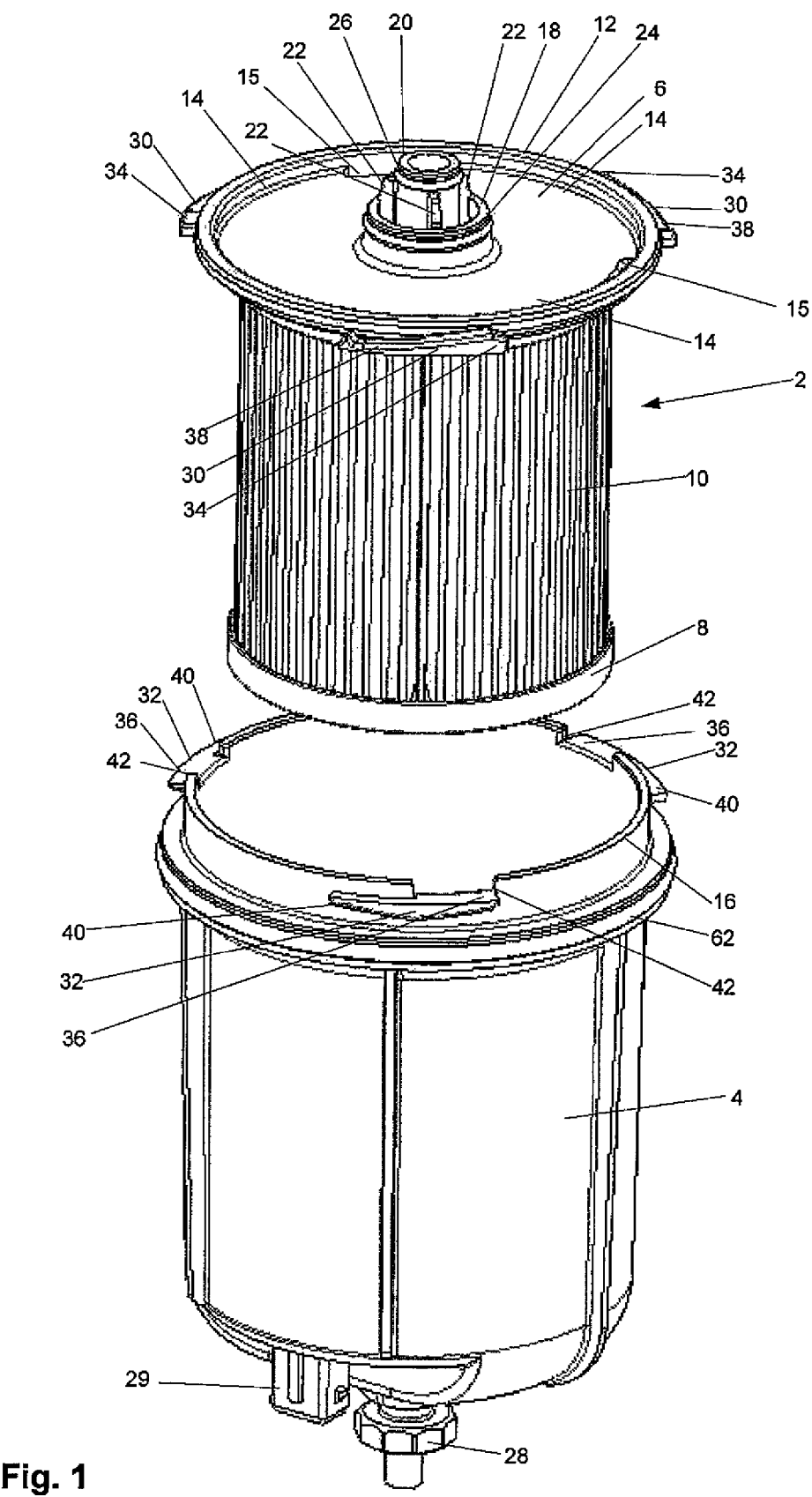
FIG. 1 illustrates a filter element and filter bowl in accordance with a first embodiment of the present invention.

Referring first to FIG. 1, this illustrates components of a fuel filter in an exploded isometric view according to a first embodiment of the present invention. Specifically, FIG. 1 illustrates a filter element 2 and a filter bowl 4. The filter bowl 4 is arranged to receive the filter element 2. The filter element 2 comprises an upper end cap 6 and a lower end cap 8. Extending between the end caps 6, 8 is a filter media 10. The filter media 10 comprises a pleated material which allows fuel to pass through, but prevents gases, particulates above a predetermined diameter and certain other liquids from passing through.

A locking ring 12 surrounds the upper end cap 6 and is spaced apart from the upper end cap 6 by support ribs 14 such that when the filter element 2 is inserted into the filter bowl 4 fluids can flow around and over the upper end cap 6. The support ribs 14 may comprise the upper end cap 6 extending to the locking ring 12 except for a number of slits 15 around the periphery of the upper end cap 6 which allow fluid to pass through. Alternatively, the slits 15 may extend substantially all of the way around the upper end cap 6 except for narrow support ribs 14 extending to the locking ring 12. The locking ring 12 is arranged to be seated upon the upper rim 16 of the bowl 4. In alternative embodiments of the present invention the locking ring 12 may overlap rim 16 or be seated upon a ledge inside the filter bowl 4 below rim 16. When the locking ring 12 is seated upon the rim 16 the filter media 10 is spaced apart from the side walls of filter bowl 4 so that fuel can flow around the filter media 10.

FIG. 1 further illustrates an opening 18 in the upper end cap 6 and a centre tube 20 extending upwards through the opening 18 spaced apart from the opening 18 by ribs 22. O-rings 24 and 26 are provided for forming a seal to the opening 18 and centre tube 20. The purpose of opening 18 and centre tube 20 will be explained below in connection with FIGS. 5 and 6.

FIG. 1 further illustrates a water drain valve 28 situated at the bottom of filter bowl 4 to remove water filtered from the fuel. The water drain valve 28 may be entirely conventional and so will not be further described. Associated with the water drain valve 28 is a Water In Fuel (WIF) sensor connector 29. The WIF sensor connector 29 allows a WIF sensor to be coupled to the filter bowl 4, the sensor being arranged to detect water within the filter bowl and to trigger the water drain 28 to extract the water. The WIF sensor and connector may also be entirely conventional.

Locking ring 12 further comprises three locking ribs 30 equally spaced apart around the ring. It will be appreciated that in alternative embodiments of the present invention there may be any number of ribs 30 and they need not be evenly spaced (in particular, to ensure that the locking ring 12 is seated upon the rim 16 in a predetermined orientation). Filter bowl 4 further comprises three corresponding locking ribs 32. Ribs 30 and 32 extend outwardly from locking ring 12 and filter bowl rim 16 respectively. More specifically, ribs 30, 32 comprise a fixed portion 34, 36 which extends radially form the locking ring 2 or bowl 4 and a flexible portion 38, 40 which extends from the fixed portions 34, 36. Flexible portions 38, 40 extend from the fixed portions 34, 36 generally parallel to, but spaced apart from, the periphery of locking ring 12 or bowl 4 such that they may flex relative to the fixed portions 34, 36. When viewed from above the flexible portions extend in a clockwise direction, though it will be appreciated that this may be reversed.

FIG. 1 shows that the ribs 32 attached to the filter bowl 4 are set below the level of rim 16. Adjacent to the fixed portions 36 of the ribs 32, the rim 16 is cut away forming cut outs 42 which allow the fixed portions 34 of the ribs 30 attached to locking ring 12 to extend through the rim 16. The cut outs 42 prevent the locking ring 12 from rotating relative to rim 16 when seated on the rim.

Figure 2:
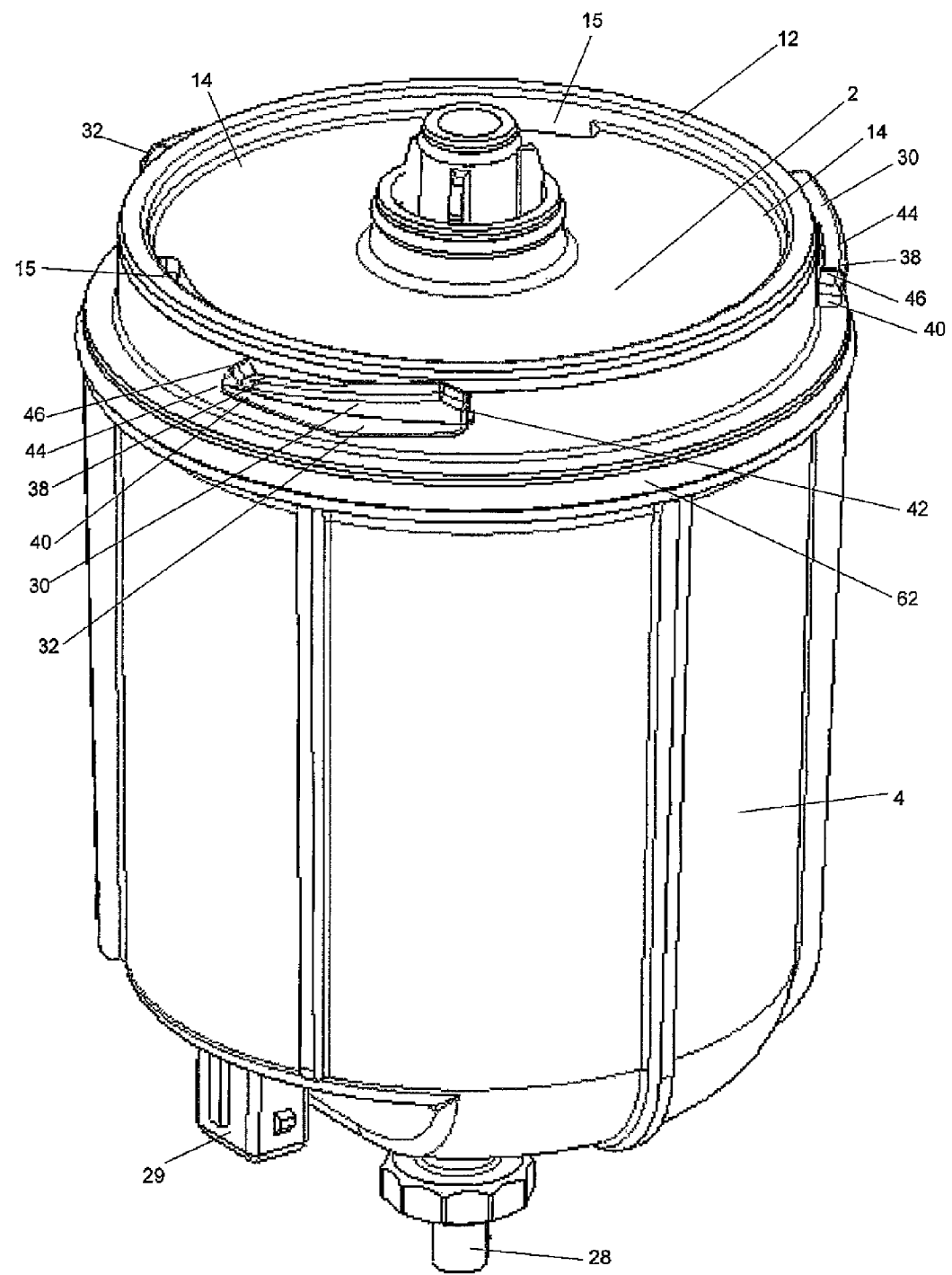
FIG. 2 illustrates the filter element and filter bowl of FIG. 1 coupled together with the filter element inserted into the filter bowl.

Referring now to FIG. 2, this illustrates filter element 2 inserted into filter bowl 4 such that locking ring 12 is seated upon rim 16 with its orientation fixed by the cut outs 42. Ribs 30, 32 are adjacent to one another and collectively form a bayonet connector rib 44 allowing the filter element 2 and filter bowl 4 to be coupled to a filter head (as will be described below in connection with FIGS. 3 and 4. Each bayonet connector rib 44 has an upper surface defined by rib 30 and a lower surface defined by rib 32. It can be seen that the upper and lower surfaces are inclined to the plane of locking ring 12 about the greater proportion of their length. At the free end of the flexible portions 38 of the ribs 30 is a lug 46. Lug 46 serves to provide a positive engagement of the bayonet connector rib 44 into a bayonet connector slot within the filter head, as will now be described in connection with FIG. 3.

Figure 3:
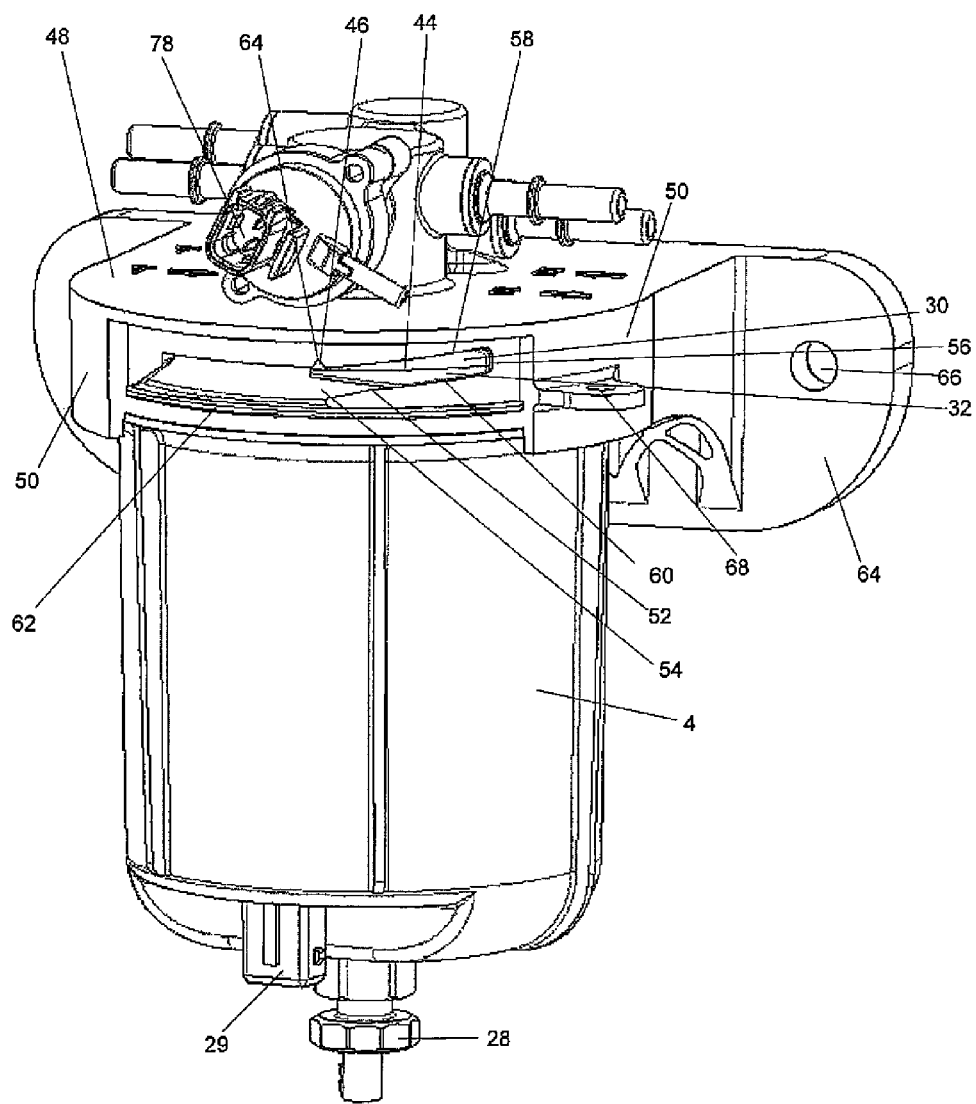
FIG. 3 illustrates in partial cross section an assembled filter including a filter head coupled to the filter element and filter bowl of FIG. 2.

FIG. 3 illustrates in a partially cut away isometric view a filter head 48 coupled to the filter element 2 and filter bowl 4 as illustrated in FIG. 2. The filter head 48 fits over the top of the filter element 2 and has a side wall 50 which extends partway down the side of filter bowl 4. Side wall 50 is partially cut away to illustrate a bayonet connector slot 52 formed within the inside of side wall 50 to receive the composite bayonet connector rib 44. It will be appreciated that a corresponding number and position of bayonet connector slots 52 are provided to match up with the bayonet connector ribs 44. Each bayonet connector slot 52 comprises a groove formed in the inner surface of wall 50, the groove having an open end 54 and a closed end 56. Adjacent to the open end 54 the side wall 50 is reduced in thickness to allow the filter head to pass over the composite bayonet connector ribs 44. The edges of this reduced thickness portion may be chamfered to assist in locating the bayonet connector ribs 44. Similarly, the end of the composite rib 44 remote from lug 46 may be chamfered to assist in locating the rib 44 in slot 52.

The filter head 48 is coupled to the filter element 2 and filter bowl 4 by aligning the bayonet connector ribs 44 with the reduced thickness wall portions and bringing the filter head 48 and filter bowl 4 together until the fixed portions 34, 36 of the bayonet connector ribs 44 are aligned with the open end of the bayonet connector slot 52. When viewed from above the filter head 48, the filter head 48 may then be rotated in a clockwise direction relative to the filter bowl 4 such that the bayonet connector ribs 44 engage the bayonet connector slots 52. It can be seen that the sides 58, 60 of the bayonet connector slot 52 are inclined relative to the plane of the locking ring 12 at the same inclination as the upper and lower surfaces of the bayonet connector rib 44. Consequently, as the bayonet connector rib 44 engages the bayonet connector slot 52 the filter head is compressed against the locking ring 12 and the side wall of filter bowl 4. Filter bowl 4 further comprises an O-ring 62 which is compressed between the filter bowl 4 and the filter head 48 to provide a fluid tight seal.

When the filter head 48 is fully rotated relative to the filter bowl 4, the lug 46 engages a corresponding groove 64 within the side wall 50 of the filter head 48. The flexibility of the bayonet connector rib 44 allows the lug 46 to be forced downwards by the upper side 58 of the bayonet connector slot 52 until it is aligned with and engages groove 64. Engagement of the lug and groove 46, 64 provides a positive indication that the bayonet connector rib 44 is fully engaged within the bayonet connector slot 52 (which may be audible or detectable to the user as the feel from a single click or a variation in the resistance against rotation of the filter head 48). FIGS. 1 to 3 illustrate the composite bayonet connector rib 44 having a reduced thickness towards its free end. This is necessary in order to prevent the bottom side 60 of slot 52 from limiting the ability of the rib 44 to flex to allow lug 46 to engage groove 64.

Correct engagement of bayonet connector rib 44 with bayonet connector slot 52 requires the presence of both ribs 30 and 32. Slot 52 is configured to be equal in depth to the combined depth of ribs 30 and 32. If the locking ring 12 is not present because upon reassembling a filter the filter element 2 has been omitted then the connection between rib 32 on the bowl 4 and slot 52 will be loose. Furthermore, without the filter element 2 being present there is no lug 46 to engage groove 64. Therefore, the filter head 48 will only be loosely connected to filter bowl 4 and will readily become undone. Consequently, the error in omitting the filter element 2 will be readily apparent to the person assembling the filter and so the possibility that a filter element is omitted when the filter is reconnected to a fuel supply system is greatly reduced.

In alternative embodiments of the present invention locking ring 12 and the remainder of the filter element 2 may be provided separately. Locking ring 12 may be modified to provide inwardly extending projections which are arranged to support the upper end cap 6 of the filter element 2. Upper end cap 6 may be increased in diameter such that it extends beyond the filter media 10 to be supported on the projections from locking ring 12.

It will be appreciated that the shape of the ribs 30 and 32, and so the composite bayonet connector rib 44, may vary. For instance, the relative sizes of the fixed and flexible portions may vary. Rib 32 may not comprise a flexible portion at all, with rib 30 including a flexible portion having a greater depth such that the composite bayonet rib 44 has a depth that is relatively constant along its length.

As noted above, the number and position of composite bayonet ribs 44 may vary. A minimum of one composite rib 44 is required in order to gain the advantageous effect of reducing the possibility of omitting a filter element 2 from the filter. In order to secure the filter head 48 to the filter bowl 4 when there is only one composite rib 44, a fixed bayonet rib may also be provided on the filter bowl 4 spaced apart from the composite rib 44. Preferably, there are at least two composite ribs 44, for instance diametrically opposite one another about the filter. If there is more than one rib 44, they need not all be the same length. The only limitation on the form of ribs 30 and 32 is that when brought together to form the composite rib 44 at least part of ribs overlap such that at least part of the composite rib has a depth which is greater than the respective portion of either rib.

Lug 46 is described above as engaging a single groove 64. However, in alternative embodiments, a series of grooves 64 may be provided allowing the filter head 48 to couple to the filter bowl 4 at a range of rotational positions according to the degree of compression required for O-ring 62.

The embodiments of the locking mechanism described above each require a locking ring mounted upon or close to the rim of the filter bowl in order to support the locking rib. However, it will be appreciated that this need not be the case. Instead, the or each locking rib may extend directly from the upper end cap or some other portion of the rest of the filter element. For instance, each locking rib may comprise an elongated first portion extending from the upper end cap and passing through a cut out in the rim of the filter bowl and a second portion extending parallel to the periphery of the filter bowl as described above. Indeed the only limitation on the design of the locking mechanism is that it includes a first portion which is coupled to or couplable to a filter media and which cooperates with a protrusion extending from the filter bowl or the filter head to form a composite bayonet rib or pin to cooperate with a corresponding bayonet connector slot formed within the other of the filter bowl or filter head.

Figure 4:
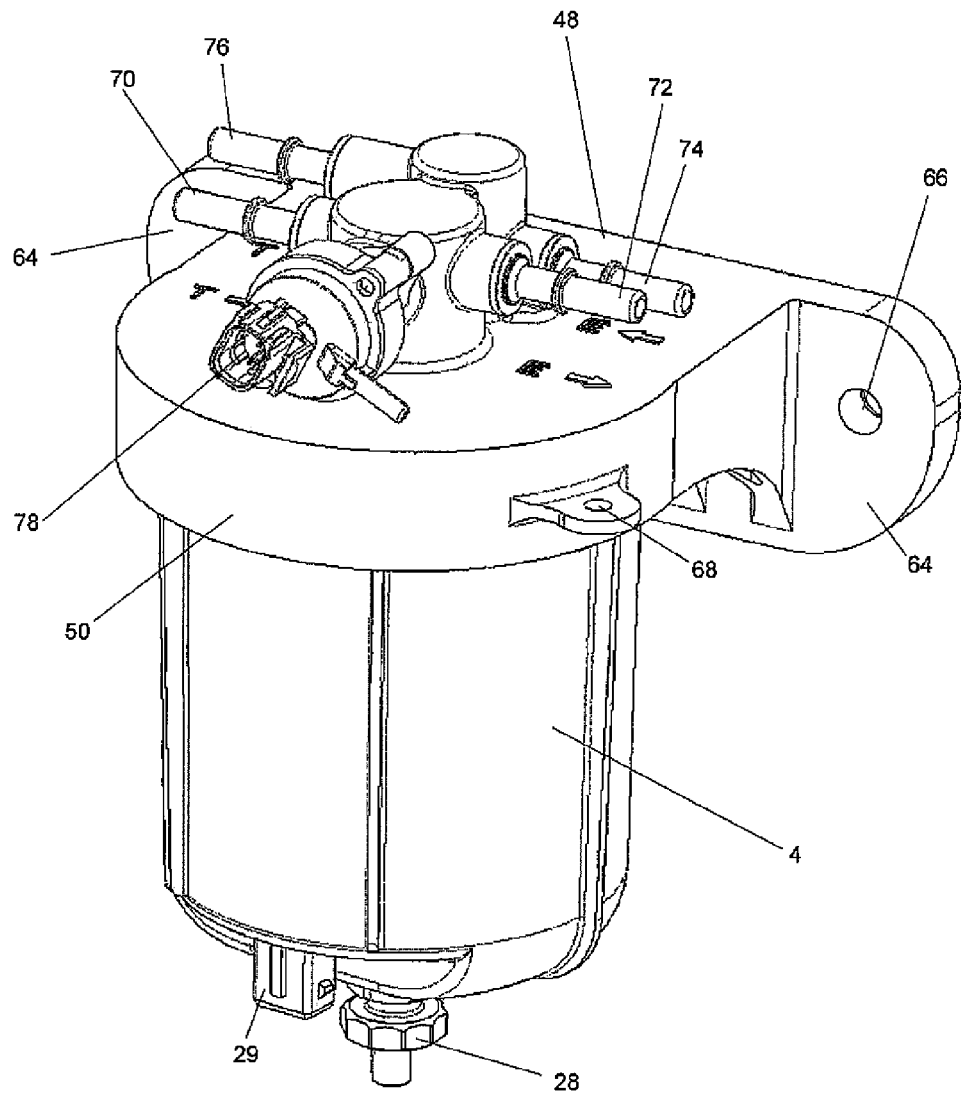
FIG. 4 is an isometric view of the assembled filter of FIG. 3 illustrating in greater detail inlets and outlets coupled to the filter head.

Referring now to FIG. 4, this is an isometric view of an assembled filter illustrating details of the filter head 48. The filter head 48 includes a flange 66 in a plane substantially perpendicular to the plane of the upper surface of the filter head 48. Flange 64 includes fixing holes 66 for securing the filter in position, for instance within a vehicle engine bay. A further fixing hole 68 is provided in a second flange extending from the side wall 50 of the filter head 48.

Filter head 48 includes a first inlet 70 for receiving fuel from a fuel tank and a first outlet 72 for passing filtered fuel to an engine (via other components of a fuel supply system). The filter head 48 further includes a second inlet 74 for receiving unused fuel returned from the engine and a second outlet 76 for returning fuel (and also air present in the filter) to the fuel tank. The filter head 48 in conjunction with the filter element 2 defines the flow paths between the respective inlets and outlets as will be described below in connection with the cross sectional views of FIGS. 5 and 6. Filter head 48 further comprises an electrical socket 78 for supplying to power to a pressure switch within the filter head 48 which is arranged to detect low filter pressure.

Figure 5:
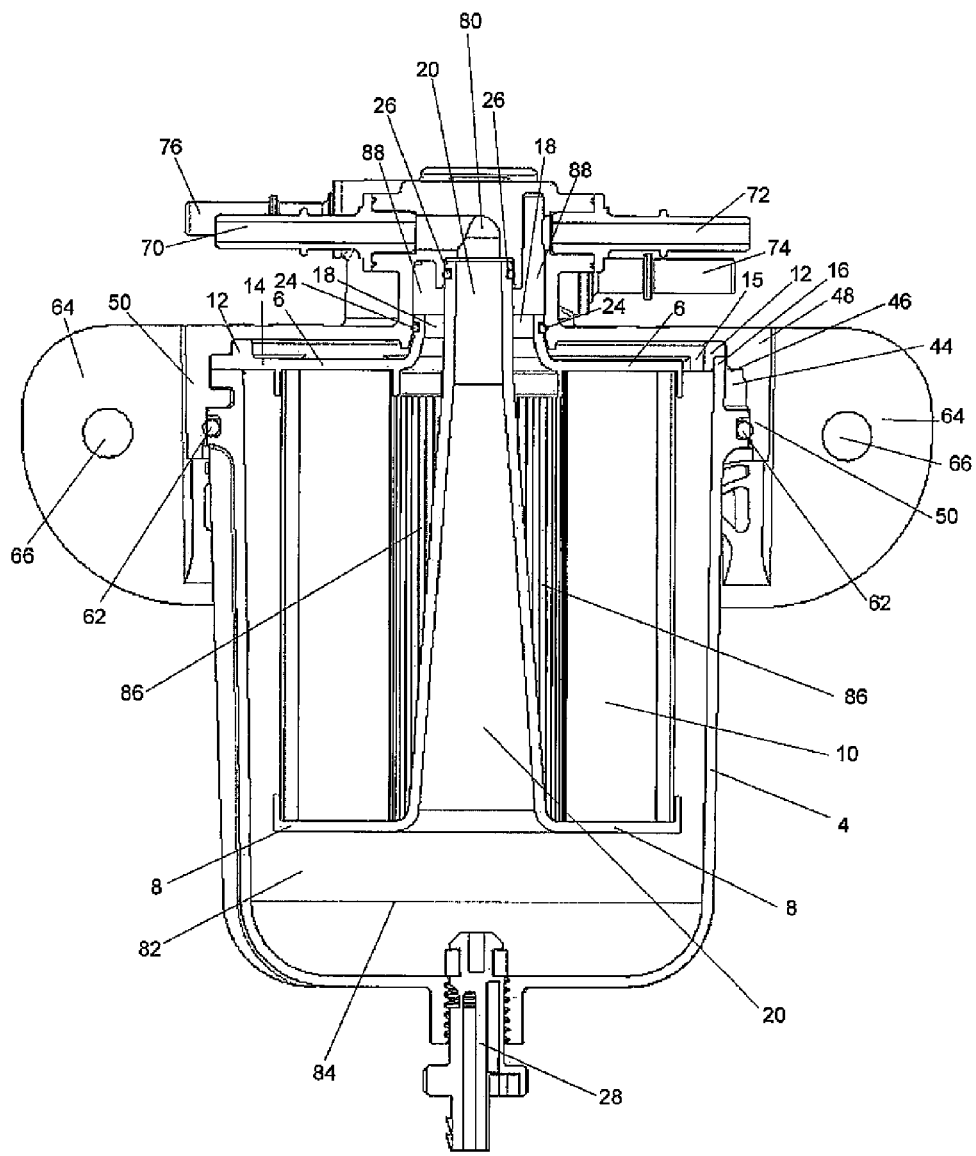
FIG. 5 is a first partial cross sectional view of the assembled filter of FIGS. 3 and 4.

FIG. 5 is a cross sectional view of the filter of FIG. 4 in a vertical plane extending through the filter head 48 and filter bowl 4 and intersecting the first inlet 70, first outlet 72 and the water drain valve 28. The cross section of FIG. 5 intersects one of the bayonet connections between ribs 30, 32 and slot 52.

FIG. 5 illustrates the flow path for fuel entering the filter from a fuel tank via first inlet 70, passing through the filter media 10 and exiting through the first outlet 72. Fuel inlet 70 is coupled to the centre tube 20 via a passage 80 formed in the filter head cap 48. The end of passage 80 is sealed to centre tube 20 via O-ring 26 which is compressed to form a fluid tight seal as the filter head 48 is coupled to the filter bowl 4 and the inclined bayonet rib 44 slides along inclined bayonet slot 52.

Fuel entering first inlet 70 passes down through the centre of the filter element 2 through the centre tube 20. Centre tube 20 diverges towards the bottom of the filter bowl in order to reduce the velocity of the fuel entering the bowl and hence to reduce re-mixing of settled water in the base of the filter bowl back into the fuel. The filter comprises a closed plenum 82 formed between the filter head 48 and the filter bowl 4, with the filter element 2 supported in the middle. Plenum space 82 is filled from proximal to the bottom of the filter by fuel passing through centre tube 20. Fuel surrounds the filter media 10 and can pass through the filter media. If sufficient fuel is supplied then the fuel continues to rise around the filter element 2 until it flows over the top of upper end cap 6 completing filling the plenum space 82. Any gas present within the fuel will rise to the top of the plenum space 82. As fuel fills the plenum space 82 from the bottom this assists in allowing the fuel and gas to separate out without causing excessive turbulence.

Any water within the fuel will settle towards the bottom of the plenum 82 and may be periodically removed through water drain valve 28. In order to prevent the supply of fuel from disturbing the water settling at the bottom of the filter bowl, a deflector plate 84 is provided below the bottom end cap 8 to deflect fuel passing down centre tube 20 sideways. Deflector plate 84 may extend only across a portion of the filter bowl 4 such that fuel can flow around the deflector plate to reach the bottom of the bowl. Alternatively, as illustrated, the deflector plate may extend across the whole width of the bowl and include holes (not shown) through which fuel can pass.

Fuel passing through the filter media 10 enters a central cavity 86 within the filter element 2 surrounding the centre tube 20. The upper end cap 6 includes an opening 18 which communicates with the central cavity 86. Centre tube 20 passes through the opening 18 spaced apart from the sides of the opening 18 by ribs 22. Opening 18 is sealed to the filter head 48 by O-ring 24. Filtered fuel passes through opening 18 into annular cavity 88 within the filter head 48 and exits the filter head 48 through first outlet 72.

O-rings 24 and 26 prevent filtered and unfiltered fuel from mixing within plenum 82. A single flow path between inlet 70 and outlet 72 is provided by the combination of the filter element 2, filter bowl 4 and filter head 48.

Figure 6:
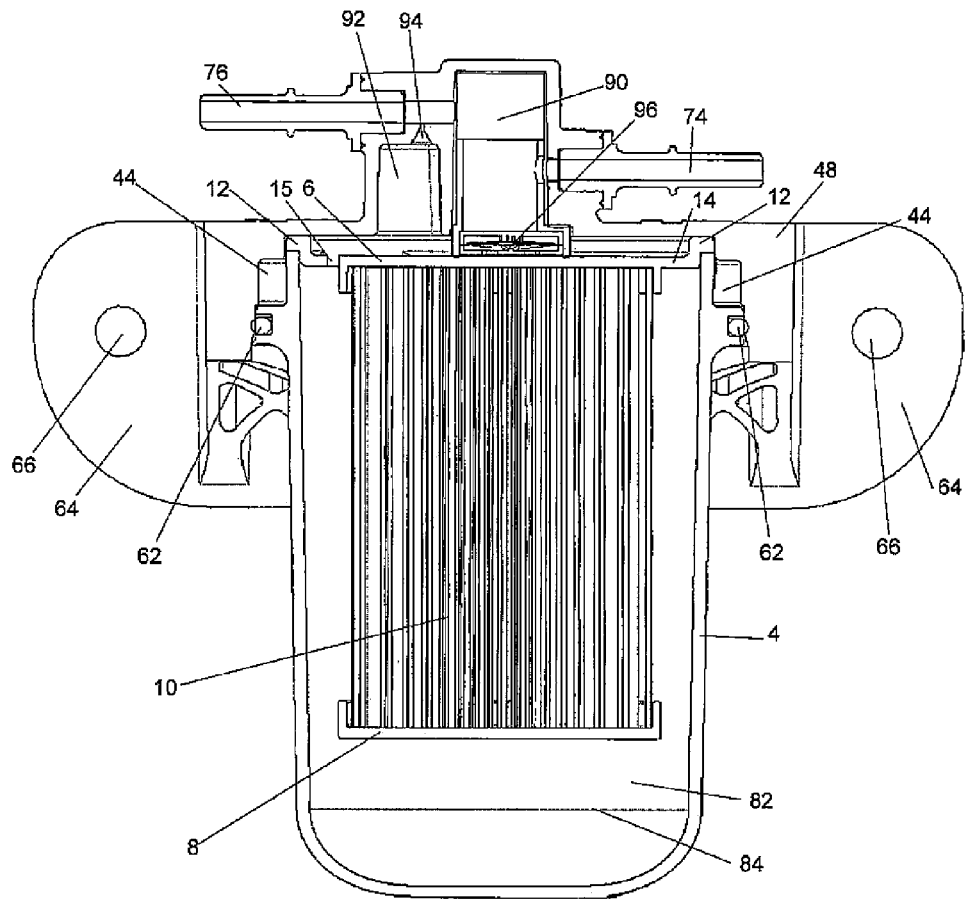
FIG. 6 is a second partial cross sectional view of the assembled filter of FIGS. 3 and 4 taken along a different plane to the view of FIG. 5.

FIG. 6 is a second cross sectional view of the filter of FIG. 4 in a vertical plane parallel to but spaced apart from the plane of FIG. 5. The cross section plane of FIG. 6 extends through the filter head 48 and filter bowl 4 and intersects the second inlet 74 and the second outlet 76.

As discussed above, fuel from the engine is returned to the filter via second inlet 74. This returned fuel is at a higher pressure than the fuel entering through inlet 70, when the engine is running (for instance 0.8 bar and 0.5 bar respectively). This returned fuel passes through a pressure reduction valve 90 and is then passed to the second outlet 76 at a reduced pressure, for instance 0.2 bar, to be returned to the fuel tank. The fuel returning from the engine does not enter plenum space 82.

As noted above, fuel entering through inlet 70 fills plenum space 82 to above the level of the upper end cap 6. Any gas present rises to the top. The plenum space 82 above upper end cap 6 communicates with a cavity 92 formed in the filter head 48. Cavity 92 in turn communicates with the second outlet 76 through a nozzle 94. Fuel within plenum 82 is at a higher pressure than the fuel in the second outlet 76 causing a small proportion of the fuel within plenum 82 to pass through the nozzle 94 to the second outlet 76. Any gas present within the plenum 82 will also pass through nozzle 94 and be returned to the fuel tank.

Owing to the fact that the plenum space 82 is filled with fuel from the bottom, the flow of gas to the top of plenum space 82 and through 94 is increased relative to a filter in which the plenum space is filled with fuel through an inlet situated in the filter head and passing downwards around the filter element. It will be understood that alternatively fuel may be supplied to a fuel filter through an inlet in the side wall of the filter bowl towards the bottom of the filter. However, it is advantageous to be able to locate all inlets and outlets on the filter head as this makes it easier to separate the filter bowl from the filter head to replace the filter element.

Figure 7:
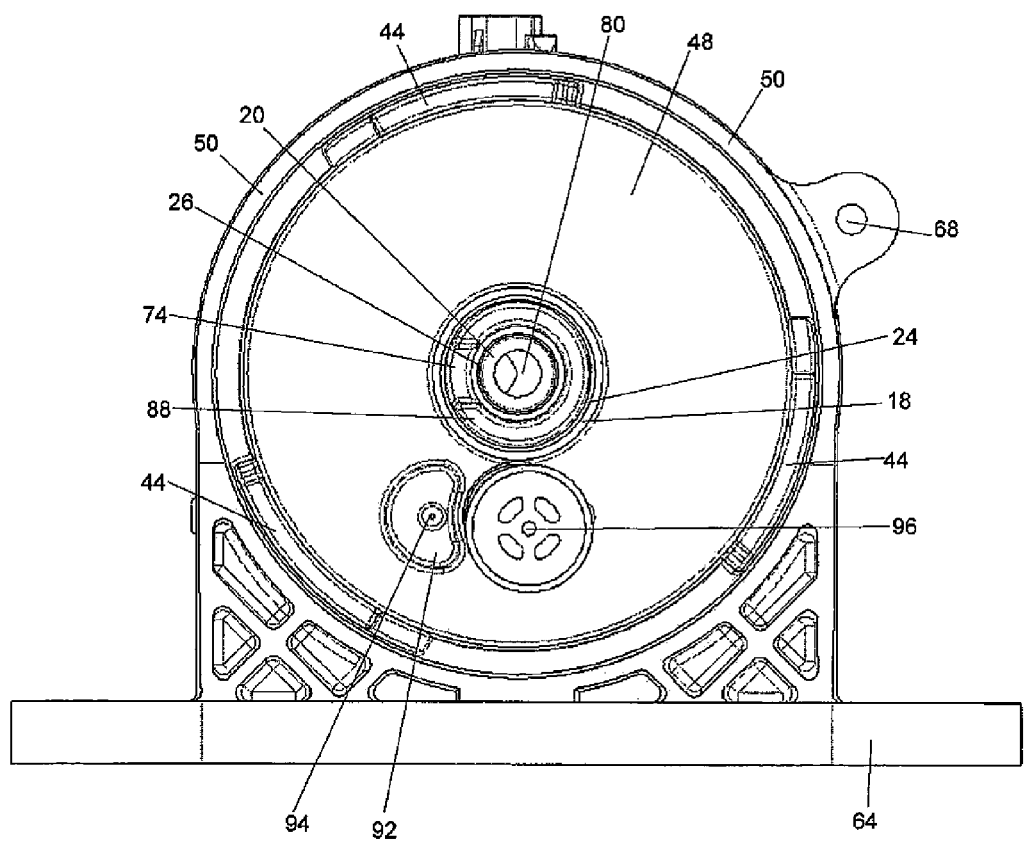
FIG. 7 is a cross sectional view through the assembled filter of FIGS. 3 and 4 taken along a plane which is perpendicular to the planes of FIGS. 5 and 6.

Referring now to FIG. 7 this is a cross sectional view through the assembled filter of FIGS. 3 and 4 in a plane which passes through the filter head 48 and intersects each of the composite bayonet connectors 44. The arrangements of fuel inlets and outlets in the filter head 48 can clearly be seen. The cross section of FIG. 7 intersects the coupling between inlet tube 80 and centre tube 20 fanning part of the filter element 2. Furthermore, the annular cavity 88 coupling to the first outlet 74 and the opening 18 in the upper end cap 6 of the filter element 2 can be seen surrounding the inlet tube 80.

Offset from the centre of the filter head 48 is the cavity 92 and the nozzle 94 which provides the purge flow of fuel passing back to the fuel tank. Adjacent to cavity 94 is a re-circulation valve 96 which allows a proportion of the fuel which returns from the engine to be re-circulated back into the fuel filter. This re-circulation assists in warming fuel entering the filter from the fuel tanks and so increases the warm-up rate and prevents or reduces cold temperature waxing. The re-circulation valve 96 is positioned below the pressure reduction valve 90. The pressure on the fuel return 74 prior to entering the re-circulation valve 96 or pressure control valve 90 is higher than the pressure in the filter plenum 82. Therefore fuel is able to flow from the return 74 to the fuel filter plenum 82 via the r-circulation valve 96 if the re-circulation valve 96 is open. As described above, the pressure control valve 90 reduces the pressure from the engine fuel return port 74, to the fuel tank return port 76, such that the pressure at the fuel tank return port 76 is less than the pressure in the filter plenum 82. This then allows fuel and/or air to flow from plenum 82 to the fuel outlet port 76 via the top end cap holes 15, and the air purge port 94.

Figure 8:
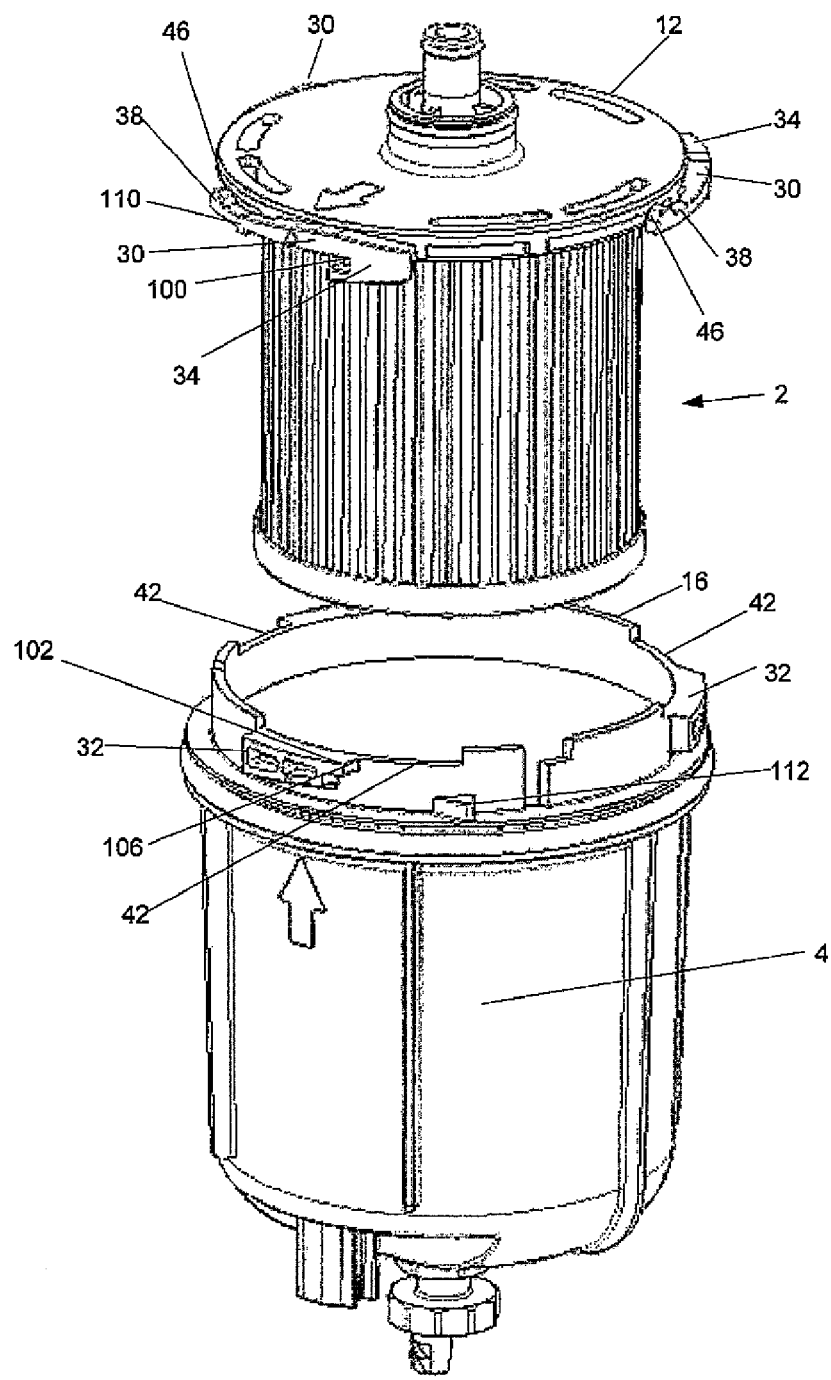
FIG. 8 illustrates a filter element and filter bowl in accordance with a second embodiment of the present invention.
Figure 9:
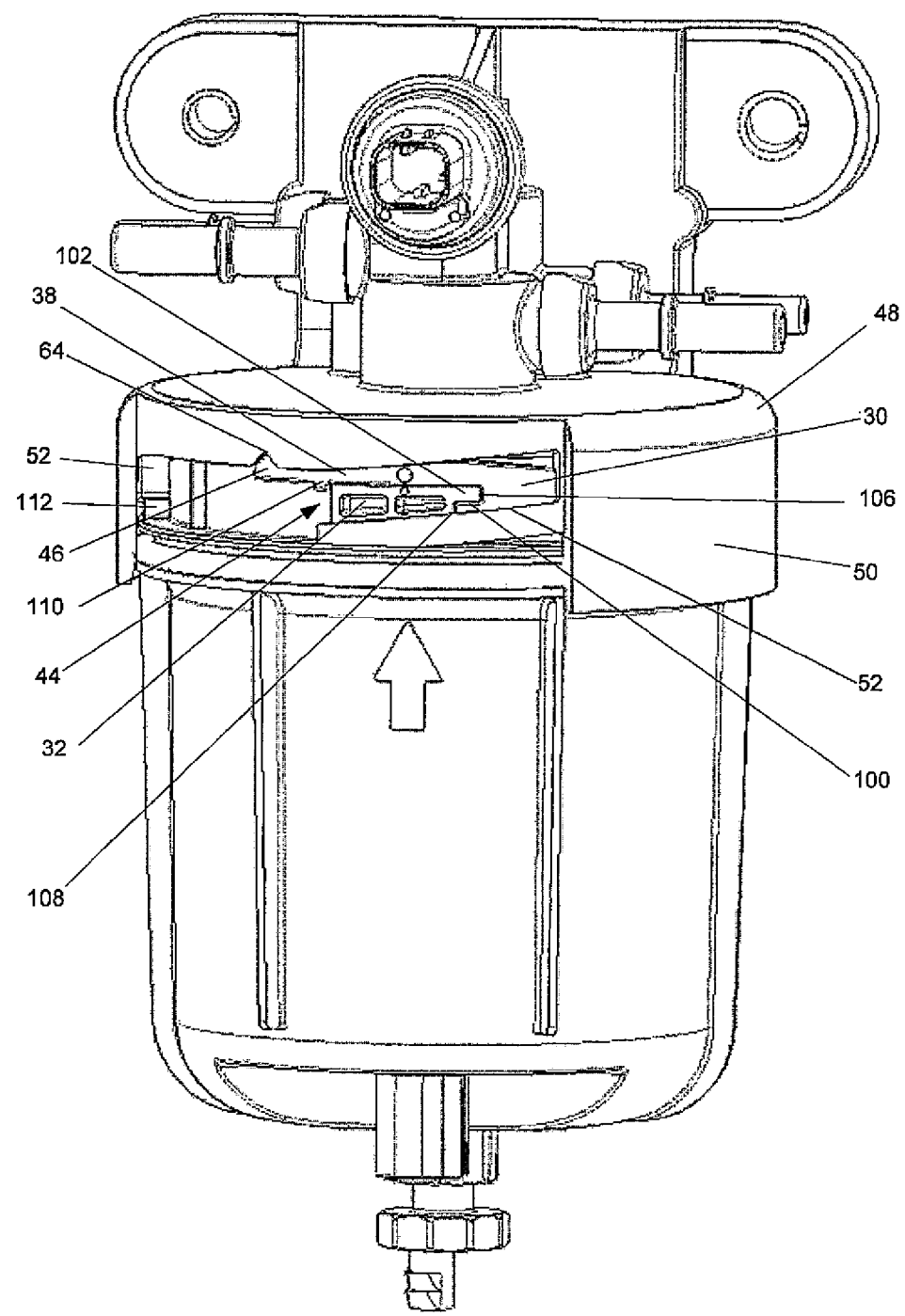
FIG. 9 illustrates in partial cross section an assembled filter including a filter head coupled to the filter element and filter bowl of FIG. 1.

Referring now to FIGS. 8 and 9, these illustrate components of a fuel filter in an exploded isometric view in accordance with a second embodiment of the present invention. The filter components of FIGS. 8 and 9 are generally similar to those of FIGS. 1 and 3. Consequently, corresponding features are referred to by the same reference numbers. Features not explicitly identified in connection with FIGS. 8 and 9 are functionally the same as or identical to the corresponding features identified in FIGS. 1 and 3.

Locking ring 12 comprises three locking ribs 30 equally spaced apart around the ring. Filter bowl 4 comprises three corresponding locking ribs 32. Ribs 30 and 32 extend outwardly from locking ring 12 and filter bowl rim 16 respectively. As for the first embodiment illustrated in FIG. 1, the filter element locking ribs 30 comprise fixed portions 34 and flexible portions 38 which extend from the fixed portions 34. Flexible portions 38 extend from the fixed portions 34 generally parallel to, but spaced apart from, the periphery of locking ring 12 such that they may flex relative to the fixed portions 34. However, differing from the first embodiment, the filter bowl ribs 32 are entirely fixed to the filter bowl 4 and include no flexible portion. Furthermore, the filter bowl ribs 32 are shorter than the filter element ribs 30 and in particular as shown in FIG. 9 do not extend under the flexible portions 38 of ribs 30.

FIG. 8 shows that the ribs 32 attached to the filter bowl 4 are set below the level of rim 16. Adjacent to the ribs 32, the rim 16 is cut away forming cut outs 42 which allow the fixed portions 34 of the ribs 30 attached to locking ring 12 to extend through the rim 16. Differing from FIG. 3 however, the cut outs 42 are elongated to allow the locking ring 12 to rotate relative to rim 16 when seated on the rim. Filter element locking ribs 30 are provided with a groove 100 and filter bowl ribs 32 are provided with a catch lug 102 arranged to be received in a groove 100. Engagement of the catch lug 102 in a groove 100 is achieved by positioning the locking ring 12 relative to the filter bowl rim 16 so that the locking ribs 30 extend through cut outs 42 and rotating the ring 12 relative to the rim 16 until each catch lug 102 is fully received in a corresponding groove 100.

Ribs 30, 32 when assembled are adjacent to one another and collectively form a composite bayonet connector rib 44 allowing the filter element 2 and filter bowl 4 to be coupled to a filter head. Each bayonet connector rib 44 has an upper surface defined by rib 30 and a lower surface defined by rib 32 and rib 30 (rib 32 not extending along the full length of rib 30). It can be seen that the upper and lower surfaces are inclined to the plane of locking ring 12 about the greater proportion of their length. At the free end of the flexible portions 38 of the rib 30 is a lug 46. Lug 46 serves to provide a positive engagement of the bayonet connector rib 44 into a bayonet connector slot within the filter head.

FIG. 9 illustrates in a partially cut away isometric view a filter head 48 coupled to the filter element 2 and filter bowl 4. The filter head 48 fits over the top of the filter element 2 and has a side wall 50 which extends partway down the side of filter bowl 4. Side wall 50 is partially cut away to illustrate a bayonet connector slot 52 formed within the inside of side wall 50 to receive the composite bayonet connector rib 44. The composite bayonet connector ribs 44 are arranged to be received within and to fit the bayonet connector slots 52. In the event that a filter is mistakenly assembled within a filter element 2 being inserted into the filter bowl 4 the filter element rib 30 may be received within the bayonet connector slot 52, however the fit is loose and it will be apparent to the installer that the filter head 48 is not correctly coupled to the filter bowl 4. In particular, because the flexible portion 38 of each filter element rib 30 is not supported along its full length by the filter bowl rib 32, lug 46 is not pressed into the corresponding lug groove 64 in the filter head 48 and so the filter bowl 4 remains loose and free to rotate relative to the filter head 48. As noted above, each filter bowl rib 32 is provided with a catch lug 102. If an attempt is made to assemble the filter without a filter element 2 then the square profile (and in particular, the square end part 106 of catch lug 102) is liable to catch against the vertical face 108 of the end of the bayonet connector slot 52 preventing the filter bowl 4 from being fully rotated into position within the filter head 48, again reducing the possibility of inadvertently omitting the filter element.

In the second embodiment of the invention the flexible portion 38 of filter element ribs 30 further comprise a second downwardly facing lug 110. The second lug 110 is arranged to pass over the filter bowl rib 32 to couple the filter bowl and filter element ribs 30, 32 together (the other end of the ribs being coupled via catch lug 102 and groove 100). Advantageously, this allows the filter element 2 and filter bowl 4 to be coupled together before insertion into the filter head 48. Furthermore, during disassembly of the filter bowl 4 and filter head 48, the downwards lug 110 serves to prevent relative rotation between the filter element 2 and the filter bowl 4 which aids disassembly by allowing these two to be removed as a single component.

As discussed above, at least one of the filter bowl 4 and the filter head 48 is provided with an O-ring to be compressed against the other part during assembly of the filter to provide a fluid tight seal between the two halves of the filter. In the second embodiment of the invention, the filter bowl 4 further comprises an inclined ramp 112. During relative rotation of the filter bowl 4 and the filter head 48 to release the composite connector rib 44 from the bayonet connector slot 52 for the first embodiment of the invention the O-ring may remain compressed between the head 48 and the bowl 4 making it difficult to remove the bowl 4 from the head 48. However, for the second embodiment of the invention, the inclined ramp 112 bears against the underside of the bayonet connector slot 52 and converts the relative rotation between the bowl 4 and the head 48 into a vertical movement which pushes the bowl 4 from the head 48 assisting in decompressing the O-ring and thereby aiding the disassembly of the filter.

Embodiments of the filter described above may be formed from a range of materials that will be well known to the person skilled in the art. For instance, the filter head and the filter bowl may be formed from a plastic material or from a metal such as aluminium. The end caps and centre tube of the filter element may similarly be made from a plastic material or a metal such as steel. The filter media may typically be formed from cellulose, glass or a plastic polymer.

Although the present invention has primarily been described in connection with filtering a fuel supply, such as petrol or diesel, it will be appreciated that it may equally be applied to filtering other fluids in order to obtain some or all of the same advantageous effects.

Embodiments of the present invention described above relate to a filter element arranged to be received in a filter bowl and being arranged to couple to a filter head to define fuel flow paths. In use, the filter will be arranged in a vertical orientation with the filter head above the filter bowl such that fuel passes down through the centre tube of the filter element. Fuel then flows back up filling the filter bowl and passing through the filter media before exiting through the outlet in the filter head. However, it will be appreciated that the orientation of the filter may vary. The filter housing may be in an upside down configuration in which a base housing is positioned below and coupled to a filter cap. The base housing provides the fuel inlets and outlets and is arranged to couple to an end cap of a filter element enclosed between the base housing and the filter cap. The filter media is contained substantially within the filter cap above the first end cap. The first end cap is arranged to couple to the base housing such that fuel entering the base housing through a first inlet passes to a centre tube within the filter element and flows upwards through the filter element and then downwards around the outside of the filter media to fill the filter from the top. A water drain valve may be provided towards the bottom of the filter cap, or in a portion of the base housing above the level of the coupling to the first end cap of the filter element. It will be appreciated that with this alternative filter arrangement the flow paths through the filter for fuel remain defined by the coupling between the filter element first end cap and the base housing. Furthermore, the filter element may be locked to the base housing or the filter cap in the same way as described above using a bayonet connection.

Other modifications and applications of the present invention will be readily apparent to the appropriately skilled person, from the teaching herein, without departing from the scope of the appended claims.

What is claimed is:

1. A filter element, comprising:
   a locking ring;
   a first end cap coupled to the locking ring;
   a filter media coupled to the first end cap; and
   a locking rib extending outwardly from the locking ring;
   wherein the locking rib comprises a first portion which extends radially from the locking ring and a second portion which extends from the first portion around the periphery of the locking ring, at least part of the second portion of the locking rib being spaced apart from the periphery of the locking ring and arranged to flex relative to the first portion of the locking rib, the locking rib forming part of a bayonet connection.

2. A filter element according to claim 1, wherein the locking rib extends outwardly from the locking ring in the plane of the locking ring.

3. A filter element according to claim 1, wherein the locking rib further comprises a first lug extending from the free end of the second portion transverse to the plane of the locking ring.

4. A filter element according to claim 1, wherein at least part of the locking rib is inclined relative to the plane of the locking ring.

5. A filter element according to claim 1, comprising at least two locking ribs spaced apart about the locking ring.

6. A filter element according to claim 1, further comprising a second end cap spaced apart from the first end cap, the filter media extending between the end caps forming a central cavity defined by the end caps and the filter media.

7. A filter element according to claim 1, wherein the first end cap is coupled to and spaced apart from the locking ring via support ribs.

8. A filter, comprising:
   i) a filter element 1, including:
      a locking ring;
      a first end cap coupled to the locking ring;
      a filter media coupled to the first end cap; and
      a locking rib extending outwardly from the locking ring;
      wherein the locking rib comprises a first portion which extends radially from the locking ring and a second portion which extends from the first portion around the periphery of the locking ring, at least part of the second portion of the locking rib arranged to flex relative to the first portion of the locking rib;
   ii) a filter bowl; and
   iii) a filter head;
   wherein when the filter media is located within the filter bowl, the locking rib cooperates with a filter bowl rib extending outwardly from proximal to the rim of the filter bowl to form a composite bayonet connector rib, the composite rib being arranged to engage a bayonet connector slot within the filter head to couple the filter bowl and head together surrounding the filter media.

9. A filter according to claim 8, wherein the locking ring is mountable upon the filter bowl such that the locking rib at least partially overlies a first portion of the filter bowl rib to form the composite bayonet connector rib.

10. A filter according to claim 9, wherein when the locking ring is mounted on the filter bowl the first portion of the locking rib at least partially overlies the first portion of the filter bowl rib to form the composite bayonet connector rib.

11. A filter according to claim 10, wherein the rim further comprises a cut away portion proximal to the first portion of the filter bowl rib such that when the locking ring is mounted on the filter bowl the cut away portion is arranged to receive the first portion of the locking rib.

12. A filter according to claim 9, wherein the locking rib further comprises a first lug extending from the free end of the second portion of the rib, the bayonet connector slot further comprising a groove arranged to receive the first lug when the composite rib is fully engaged in the bayonet slot.

13. A filter according to claim 12, wherein the filter bowl rib comprises an end catch portion and the locking rib further comprises a groove arranged to receive the end catch portion such that the locking rib is partially received within the locking rib, the end catch portion being further arranged to engage the filter head bayonet connector slot if the filter bowl is coupled to the filter head without a filter element there between.

14. A filter according to claim 13, wherein the second portion of the locking rib further comprises a second lug extending in an opposite direction to the first lug, the second lug being arranged to overlap an end portion of the filter bowl rib remote from the end catch portion such that the locking rib and the filter bowl rib are coupled together.

15. A filter according to claim 8, wherein at least part of the composite rib is inclined relative to the plane of the locking ring and at least part of the bayonet slot comprises a corresponding incline.

16. A filter according to claim 8, wherein at least one of the filter bowl and the filter head further comprises an annular seal arranged such that when the filter bowl, the locking ring and the filter head are coupled together the annular seal is compressed between the filter bowl and filter head.

17. A filter according to claim 16, wherein the filter bowl further comprises a disassembly feature arranged, during relative rotation of the filter head and the filter bowl to disassemble the filter, to engage the filter head forcing the filter bowl from the filter head and decompressing the annular seal between the filter bowl and the filter head.

18. A filter element according in claim 1, wherein the locking ring is supported in spaced apart, outwardly surrounding relation to the first end cap.

19. A filter element according to claim 1, wherein the locking ring is connected to the first end cap via support ribs, the support ribs defining flow paths between the first end cap and locking ring.

20. A filter element according in claim 1, wherein the second portion of the locking rib extends from the first portion to a distal free end.

21. A filter element, comprising:
a ring of filtration media circumscribing a central axis;
an end cap at one end of the media ring;
a locking ring supported by the end cap and having an outer radial dimension greater than the outer radial dimension of the end cap; and
at least one locking rib projecting radially outward from the locking ring; the at least one locking rib comprising i) a first portion connected to the locking ring and extending radially outward from the locking ring; and ii) a second, flexible portion which extends from the first portion circumferentially around a portion of the periphery of the locking ring in a spaced-apart manner from the locking ring, wherein at least part of the second portion of the locking rib can flex relative to the first portion of the locking rib.

22. A filter element according in claim 21, wherein the locking ring is supported in spaced apart, outwardly surrounding relation to the end cap.

23. A filter element according to claim 21, wherein the locking ring is connected to the end cap via support ribs, the support ribs defining flow paths between the end cap and locking ring.

24. A filter element according in claim 21, wherein the locking ring projects radially outwardly from the end cap in a planar direction transverse to the central axis of the media ring.

25. A filter element according to claim 24, wherein the at least one locking rib extends outwardly from the locking ring in the plane of the locking ring.

26. A filter element according to claim 25, wherein the at least one locking rib is inclined relative to the plane of the locking ring.

27. A filter element according in claim 21, wherein the second portion of the locking rib extends from the first portion to a distal free end.

28. A filter element according in claim 21, wherein the at least one locking rib further comprises a first lug extending axially from a free end of the second portion in a direction away from the media ring.

29. A filter element according to claim 21, comprising at least two locking ribs spaced apart about the locking ring.

* * * * *